US010764949B2

(12) United States Patent
Huang et al.

(10) Patent No.: US 10,764,949 B2
(45) Date of Patent: *Sep. 1, 2020

(54) MULTI-CONNECTION ACCESS POINT

(71) Applicant: Hewlett Packard Enterprise Development LP, Houston, TX (US)

(72) Inventors: Wei Huang, Beijing (CN); Hsiu-Wei Liu, Santa Clara, CA (US); Chunfeng Wang, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/656,260

(22) Filed: Oct. 17, 2019

(65) Prior Publication Data

US 2020/0068636 A1 Feb. 27, 2020

Related U.S. Application Data

(63) Continuation of application No. 15/580,071, filed on Aug. 23, 2018, now Pat. No. 10,485,043.

(51) Int. Cl.
*H04W 76/15* (2018.01)
*H04L 12/46* (2006.01)
(Continued)

(52) U.S. Cl.
CPC ......... *H04W 76/15* (2018.02); *H04L 12/4641* (2013.01); *H04L 63/0209* (2013.01);
(Continued)

(58) Field of Classification Search
CPC . H04W 84/045; H04W 92/02; H04W 72/005; H04W 76/40; H04W 24/02; H04W 84/18; H04W 88/08; H04W 88/12; H04W 8/085; H04W 92/04; H04W 12/08; H04W 48/08; H04W 28/06; H04W 28/16; H04W 36/0066; H04W 72/12; H04W 74/02;
(Continued)

(56) References Cited

U.S. PATENT DOCUMENTS 8,625,462 B2 1/2014 Mercier et al.
2002/0022483 A1 2/2002 Thompson et al.
(Continued)

FOREIGN PATENT DOCUMENTS

CN 101252498 A 8/2008
CN 101815365 A 8/2010
(Continued)

OTHER PUBLICATIONS

European Search Report and Search Opinion Received for EP Application No. 16898878.0, dated Jul. 27, 2018, 8 pages.
(Continued)

*Primary Examiner* — Nimesh Patel

(57) ABSTRACT

Example implementations relate to multi-connection access points. For example, an access point can include instructions to: establish a first connection to a first controller, wherein the access point receives configuration data from the first controller to generate a first virtual access point with the first controller; and establish a second connection to a second controller, wherein the access point receives configuration data from the second controller to generate a second virtual access point with the second controller.

20 Claims, 5 Drawing Sheets

(51) Int. Cl.
*H04W 88/10* (2009.01)
*H04L 29/06* (2006.01)
*H04W 24/02* (2009.01)
*H04W 88/12* (2009.01)
*H04W 76/16* (2018.01)
*H04W 92/12* (2009.01)

(52) U.S. Cl.
CPC ............ *H04W 24/02* (2013.01); *H04W 88/10* (2013.01); *H04W 88/12* (2013.01); *H04W 76/16* (2018.02); *H04W 92/12* (2013.01)

(58) Field of Classification Search
CPC ......... H04W 8/02; H04W 88/18; H04W 8/26; H04W 48/18; H04W 80/00; H04W 92/12; H04W 60/00; H04W 4/02; H04W 84/00; H04W 74/00; H04W 40/20; H04W 84/12; H04W 36/0011; H04W 36/0005; H04W 36/0022; H04W 12/06; H04W 4/023; H04W 72/10; H04W 4/70; H04W 72/082; H04W 28/18; H04W 74/0875; H04W 28/08; H04W 28/20; H04W 28/22; H04W 36/0055; H04W 36/165; H04W 48/20; H04W 4/025; H04W 72/0453; H04W 16/20; H04W 28/26; H04W 36/0088; H04W 36/08; H04W 36/22; H04W 36/32; H04W 4/027; H04W 88/10; H04W 72/0446; H04W 76/15; H04W 76/16; H04B 7/024; H04B 7/0634; H04B 7/0452; H04B 7/0617; H04B 17/309; H04B 7/0456; H04B 7/0689; H04B 7/0626; H04B 7/0695; H04L 29/06; H04L 69/16; H04L 69/18; H04L 49/351; H04L 5/0035; H04L 2001/0093; H04L 12/189; H04L 29/06027; H04L 49/602; H04L 63/0263; H04L 63/0281; H04L 63/102; H04L 63/104; H04L 63/20; H04L 63/0272; H04L 12/66; H04L 61/2007; H04L 61/6004; H04L 61/609; H04L 12/4633; H04L 12/4641; H04L 2209/80; H04L 41/0803; H04L 43/16; H04L 51/20; H04L 51/38; H04L 47/14; H04L 12/5692; H04L 45/302; H04L 61/6077; H04L 67/322; H04L 12/2876; H04L 41/0859; H04L 47/10; H04L 47/2416; H04L 67/306; H04L 69/24; H04L 63/0209; G06F 19/00; G06F 21/31; G06F 21/36; G06F 2221/2105; G06F 2221/2113; G06F 3/0481; G06F 3/0484; G06F 3/0488; G06F 3/04883; Y02D 70/1226; Y02D 70/1242; Y02D 70/1244; Y02D 70/1262; Y02D 70/142; Y02D 70/146; Y02D 70/164; Y02D 70/25; Y02D 70/1264; Y02D 70/24

See application file for complete search history.

(56) References Cited

U.S. PATENT DOCUMENTS

| | | |
|---|---|---|
| 2013/0083689 A1 | 4/2013 | Mercier et al. |
| 2013/0163515 A1 | 6/2013 | Yeoh et al. |
| 2014/0126466 A1 | 5/2014 | Hamdi et al. |
| 2015/0009966 A1 | 1/2015 | Lee et al. |
| 2016/0105379 A1 | 4/2016 | Murthy et al. |
| 2016/0197785 A1 | 7/2016 | Petrick et al. |
| 2016/0335111 A1 | 11/2016 | Bruun et al. |
| 2018/0376385 A1 | 12/2018 | Killadi et al. |

FOREIGN PATENT DOCUMENTS

| | | |
|---|---|---|
| CN | 102984701 A | 3/2013 |
| CN | 105530682 A | 4/2016 |

OTHER PUBLICATIONS

International Search Report and Written Opinion received for PCT Patent Application No. PCT/CN2016/103742, dated Jul. 27, 2017, 6 pages.

MULTI-CONNECTION ACCESS POINT

CROSS-REFERENCE TO RELATED APPLICATIONS

This application is a continuation of U.S. patent application Ser. No. 15/580,071, filed on Aug. 23, 2018, and now issued as U.S. Pat. No. 10,485,043, the entire contents of which are incorporated by reference herein. U.S. patent application Ser. No. 15/580,071 is a National Stage Entry of PCT Application PCT/CN2016/103742, filed on Oct. 28, 2016, the entire contents of which are incorporated by reference herein. Applicant hereby rescinds any disclaimer of claim scope in the parent application or the prosecution history thereof and advises the USPTO that the claims in this application may be broader than any claim in the parent application(s).

BACKGROUND

Networks can include a plurality of access points that are controlled by a controller. The controller can be a centralized controller for the plurality of access points. The controller can be utilized to manage, configure, monitor, and/or troubleshoot the plurality of access points within a network. The controller can be utilized to encrypt and/or decrypt data packets received from the plurality of access points. The controller can be utilized to configure the plurality of access points and/or change a configuration of the plurality of access points.

DETAILED DESCRIPTION

Figure 1:
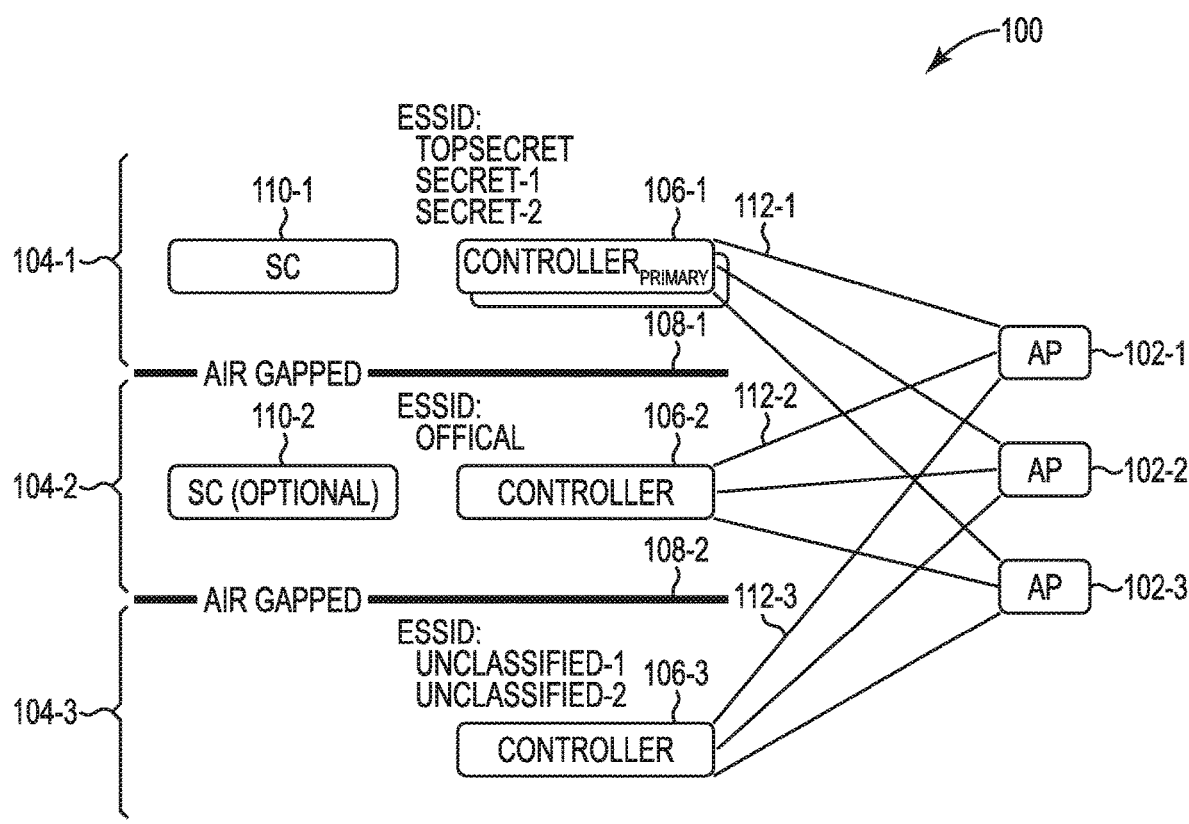
FIG. 1 illustrates an example environment for multi-connection access point, consistent with the present disclosure.

Multi-connection access point systems can enable a plurality of different controllers to control functions of a single access point within a network. As used herein, a controller (e.g., network controller) can be a network device that can be utilized to manage, configure, monitor, and/or troubleshoot access points within a network (e.g., wireless network, local area network (LAN), wide area network (WAN), internet, etc.). As used herein, 'access point' (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards. The network can include a plurality of access points to enable computing devices to exchange data. In some examples, a first computing device can exchange data packets with a second computing device via a plurality of access points.

The multi-connection access point systems can utilize a plurality of controllers to manage access points of the network. In some examples, the plurality of controllers can manage the same access points of the network. For example, the plurality of access points can include a plurality of ESSIDs that correspond to the plurality of controllers. In this example, an access point from the plurality of access points can direct data packets to a particular controller of the plurality of controllers based on an ESSID of the data packets received by the plurality of access points. For example, a first controller can have a first ESSID and a second controller can have a second ESSID. In this example, an access point can include the first ESSID and the second ESSID. In this example, the access point can direct data packets with the first ESSID to the first controller and direct packets with the second ESSID to the second controller. In some examples, the first controller and the second controller can be separated by an air gap. As used herein, an air gap is a network security measure to physically isolate a first network from a second network such that communication does not exist between the first network and the second network.

The multi-connection access point system can enable a plurality of access points to be managed by a plurality of different controllers simultaneously. In some examples, the multi-connection access point system can be utilized separate a first type of data to a first controller and a second type of data to a second controller based on an ESSID of the data. In some examples, the first controller can be utilized by a first entity and the second controller can be utilized by a second entity. In these examples, the first controller and the second controller can be separated by an air gap to secure data of the first entity from the second entity and vice versa. In other examples, the first controller can be utilized to encrypt or decrypt data packets with a first security level and the second controller can be utilized to encrypt or decrypt data packets with a second security level.

FIG. 1 illustrates an example environment 100 for multi-connection access point, consistent with the present disclosure. The environment 100 can represent a network with a plurality of access points 102-1, 102-2, 102-3 in communication with a plurality of controllers 106-1, 106-2, 106-3. In some examples, the plurality of access points 102-1, 102-2, 102-3 can be coupled to a number of devices (e.g., user devices, mobile devices, etc.) to transmit data packets from the number of devices to one or more of the plurality of controllers 106-1, 106-2, 106-3.

In some examples, each of the plurality of access points 102-1, 102-2, 102-3 can be coupled to each of the plurality of controllers 106-1, 106-2, 106-3. In these examples, the plurality of access points 102-1, 102-2, 102-3 can include a corresponding ESSID to each of the plurality of controllers 106-1, 106-2, 106-3. For example, the access point 102-1 can be coupled and/or managed by controller 106-1 via pathway 112-1 with a corresponding ESSID. In this example, the access point 102-1 can also be coupled and/or managed by controller 106-2 via pathway 112-2 with a corresponding second ESSID. In this example, the access point 102-1 can also be coupled and/or managed by controller 106-3 via pathway 112-3 with a corresponding third ESSID.

Each of the plurality of controllers 106-1, 106-2, 106-3 can be within a corresponding zone of a plurality of zones 104-1, 104-2, 104-3. In some examples, each of the plurality of zones 104-1, 104-2, 104-3 can be separated by air gaps 108-1, 108-2. For example, zone 104-1 and zone 104-2 can be separated by air gap 108-1. Separating each of the plurality of zones 104-1, 104-2, 104-3 by air gaps 108-1, 108-2 can prevent communication between each of the plurality of controllers 106-1, 106-2, 106-3. In addition, separating each of the plurality of zones 104-1, 104-2, 104-3 by air gaps 108-1, 108-2 can allow a first controller of the plurality controllers 106-1, 106-2, 106-3 to manage the plurality of access points 102-1, 102-2, 102-3 without affecting a second controller of the plurality of controllers 106-1, 106-2, 106-3 from separately managing the plurality of access points 102-1, 102-2, 102-3.

In some examples, each of the plurality of controllers 106-1, 106-2, 106-3 can utilize a particular communication protocol. For example, the controller 106-1 can utilize a first protocol and controller 106-2 can utilize a second protocol. In some examples, the first protocol can be different than the second protocol.

In some examples, one of the plurality of controllers 106-1, 106-2, 106-3 in a first zone of the plurality of zones 104-1, 104-2, 104-3 can alter or change a number of settings for the plurality of access points 102-1, 102-2, 102-3 without altering settings of a second zone of the plurality of zones 104-1, 104-2, 104-3. For example, controller 106-2 within zone 104-2 can alter settings of the access points 102-1, 102-2, 102-3 that correspond to zone 104-2. In this example, the altered settings corresponding to the zone 104-2 may not affect settings of zone 104-1 or zone 104-3. That is, the controller 106-2 can alter settings of the access points 102-1, 102-2, 102-3 for the connection between the plurality of access points 102-1, 102-2, 102-3 and the controller 106-2 without altering settings of the access points 102-1, 102-2, 102-3 and the controllers 106-1, 106-3.

In some examples, the plurality of controllers 106-1, 106-2, 106-3 can each utilize an encryption and/or decryption method. In some examples, each of the plurality of controllers 106-1, 106-2, 106-3 can utilize a different encryption and/or decryption method. For example, controller 106-1 can utilize a first type of encryption method for data packets received from or sent to the plurality of access points 102-1, 102-2, 102-3 and controller 106-2 can utilize a second type of encryption method for data packets received from or sent to the plurality of access points 102-1, 102-2, 102-3. In these examples, the plurality of controllers 106-1, 106-2, 106-3 can utilize different encryption and/or decryption methods such that data packets to be sent to controller 106-1 are not capable of being decrypted by controller 106-2. These examples can increase security between the plurality of controllers 106-1, 106-2, 106-3.

In some examples, the plurality of zones 104-1, 104-2, 104-3 can include service controllers (SC) 110-1, 110-2. In some examples, each of the plurality of zones 104-1, 104-2, 104-3 can include a corresponding service controller 110-1, 110-2. In some examples, the service controllers 110-1, 110-2 can correspond to controllers 106-1, 106-2 within the corresponding zones 104-1, 104-2. For example, zone 104-1 can include a controller 106-1 and a corresponding service controller 110-1. In some examples, service controllers 110-1, 110-2 can generate security protocols for the corresponding controllers 106-1, 106-2. In some examples, the service controllers 110-1, 110-2 can be utilized to define security protocols for a corresponding zone 104-1, 104-2. In some examples, the service controllers 110-1, 110-2 can be utilized to alter security protocols or other security settings for the corresponding zone 104-1, 104-2.

In some examples, the plurality of zones 104-1, 104-2, 104-3 can be organized in a hierarchy with primary zones with higher priority over secondary zones. For example, zone 104-1 can have priority over zone 104-2. For example, the controller 106-1 can be a primary zone that includes administrative control and/or management over the plurality of access points 102-1, 102-2, 102-3. In this example, administrative settings for the plurality of access points 102-1, 102-2, 102-3 may be altered by the controller 106-1 while the administrative settings may not be altered by controllers 106-2, 106-3.

As used herein, administrative settings for the plurality of access points 102-1, 102-2, 102-3 can include, but is not limited to debug logs, common information logs, troubleshooting settings, management settings, quantity of zones settings, radio configuration, channel configuration, multi-connection profile, reboot capabilities for the controllers 106-1, 106-2, 106-3, reboot capabilities for the access points 102-1, 102-2, 102-3, and/or other administrative settings that may not affect settings of the other zones 104-2, 104-3. For example, the controller 106-1 can alter a quantity of zones for the plurality of access points 102-1, 102-2, 102-3. In some examples, the zone 104-2 can be a secondary zone that does not have priority over zone 104-1. In this example, controller 106-2 of zone 104-2 can connect to the plurality of access points 102-1, 102-2, 102-3 after the controller 106-1 of zone 104-1 connects to the plurality of access points 102-1, 102-2, 102-3. In this example, the controller 106-2 of zone 104-2 can receive the multi-connection configuration from the controller 106-1. As used herein, the multi-connection configuration can include the administrative settings as described herein for the environment 100. In some examples, the controller 106-2 can be restricted to providing tunnel mode for the plurality of access points 102-1, 102-2, 102-3, In this way the environment 100 may not experience counteractive settings or setting changes that negatively affect the environment 100.

The environment 100 can be utilized to enable the plurality of access points 102-1, 102-2, 102-3 to have multiple zones 104-1, 104-2, 104-3 that are managed by corresponding controllers 106-1, 106-2, 106-3. In some examples, the multiple zones 104-1, 104-2, 104-3 can be separated by air gaps to prevent data packets from being decrypted by an incorrect controller. In some examples, the environment 100 can be utilized to enable a first controller for a first type of data and enable a second controller for the same access points for a second type of data. In this way, an organization can separate the management of secure data from unsecure data. In another way, multiple organizations can utilize the environment 100 to limit a quantity of access points within an area while maintaining security and separation between the multiple organizations.

Figure 2:
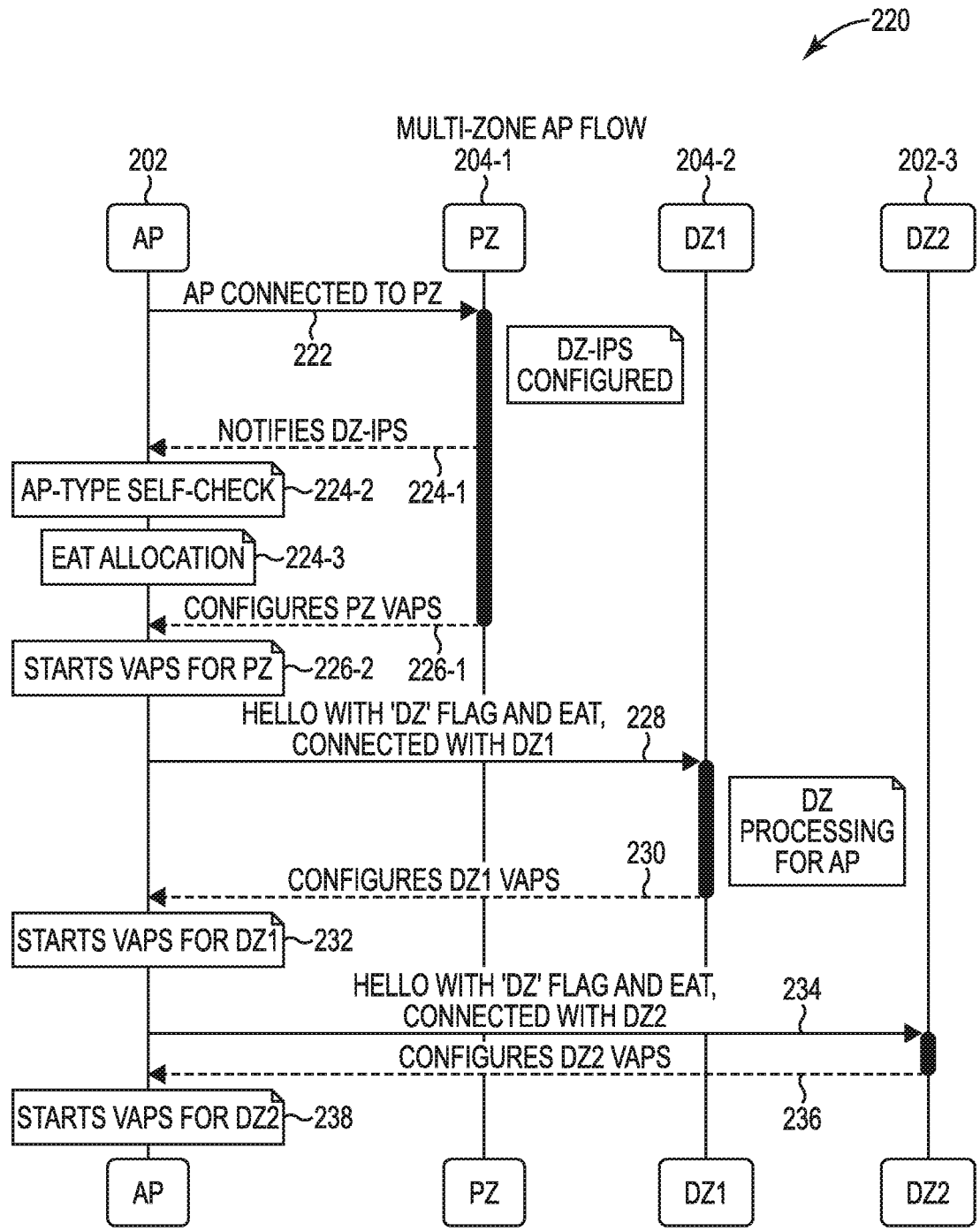
FIG. 2 further illustrates an example method for multi-connection access point, consistent with the present disclosure.

FIG. 2 further illustrates an example method 220 for multi-connection access point, consistent with the present disclosure. In some examples, the method 220 can be utilized to generate the multi-connection access point environment 100 as referenced in FIG. 1. For example, the method 220 can be a multi-connection configuration of a plurality of access points and/or a plurality of controllers. The method 220 can be executed by an access point 202 and/or a number of zones 204-1, 204-2, 204-3 with corresponding controllers as described herein.

At 222, the method 220 can include the access point 202 connecting to a controller corresponding to zone 204-1. As described herein, the number of zones 204-1, 204-2, 204-3 can be in a hierarchy. For example, zone 204-1 can be considered a primary zone (PZ) when the zone 204-1 is a top zone within the hierarchy. For example, the zone 204-1 can be utilized to manage administrative settings for the access point 202 as described herein. In some examples, the controllers corresponding to zone 204-1 can: be a first zone to connect with the access point 202, have full control of the access point 202, have radio control over the access point 202, have channel configuration control over the access point 202, and/or control other features of the access point 202. In some examples, a controller corresponding to zone 204-1 can configure internet protocols (IPs) for controllers corresponding to zone 204-2 and/or zone 204-3.

At 224-1, the method 220 can include notifying, by the controller corresponding to the zone 204-1, the IPs for controllers corresponding to zone 204-2 and/or zone 204-3. The access point 202 can receive the notification from the controller corresponding to zone 204-1. At 224-2, the method 220 can include the access point 202 performing an access point self-check. At 224-3, the method 220 can include the access point 202 determining an ESSID assignment table (EAT) allocation based on the notification and/or self-check.

At 226-1, the method 220 can include the controllers corresponding to zone 204-1 configuring virtual access points for controllers corresponding to zone 204-2 and/or zone 204-3. As used herein, a virtual access point is an emulation of an access point. In some examples, the access point 202 can include a plurality of virtual access points that each can virtually act as individual physical access points. At 226-2, the method 220 can include the access point 202 starting the virtual access points for zone 204-1. In some examples, starting the virtual access point for zone 204-1 can include starting communication of data packets between the access point 202 and the controllers corresponding to zone 204-1. In some examples, the access point 202 can start the virtual access points for the zone 204-1 based on the configuration from zone 204-1 at 226-1.

At 228, the method 220 can include the access point 202 sending a zone flag (e.g., data zone (DZ) flag, etc.) to zone 204-2. In some examples, the access point 202 can simultaneously send a zone flag to zone 204-2 and zone 204-3. In these examples, the access point 202 can start virtual access points for a zone that responds to the zone flag first. For example, controllers corresponding to zone 204-2 can send configuration data to the access point 202 in response to the zone flag sent at 228 before controllers corresponding to zone 204-3 can respond.

At 232, the method 220 can include the access point 202 starting virtual access points for controllers corresponding to zone 204-2. As described herein, starting the virtual access points for the controllers corresponding to zone 204-2 can include starting communication of data packets between the access point 202 and controllers corresponding to zone 204-2. In some examples, the controllers corresponding to zone 204-2 can be data zone (DZ) controllers that are lower in the zone hierarchy compared to zone 204-1. That is, the controllers corresponding to zone 204-2 can include limited capabilities. For example, the controllers corresponding to zone 204-2 may not be able to reboot the access point 202, provision the access point 202, and/or upgrade an image of the access point 202.

At 234, the method 220 can include the access point 202 sending a zone flag (e.g., data zone (DZ) flag, etc.) to zone 204-3. In some examples, the controllers corresponding to zone 204-3 can respond at 236 with configuration data for virtual access points for the controllers corresponding to zone 204-3. For example, controllers corresponding to zone 204-3 can send configuration data to the access point 202 in response to the zone flag sent at 234.

At 238, the method 220 can include the access point 202 starting virtual access points for controllers corresponding to zone 204-3. As described herein, starting the virtual access points for the controllers corresponding to zone 204-3 can include starting communication of data packets between the access point 202 and controllers corresponding to zone 204-3. In some examples, the controllers corresponding to zone 204-3 can be data zone (DZ) controllers that are lower in the zone hierarchy compared to zone 204-1. That is, the controllers corresponding to zone 204-3 can include limited capabilities. For example, the controllers corresponding to zone 204-3 may not be able to reboot the access point 202, provision the access point 202, and/or upgrade an image of the access point 202.

Figure 3:
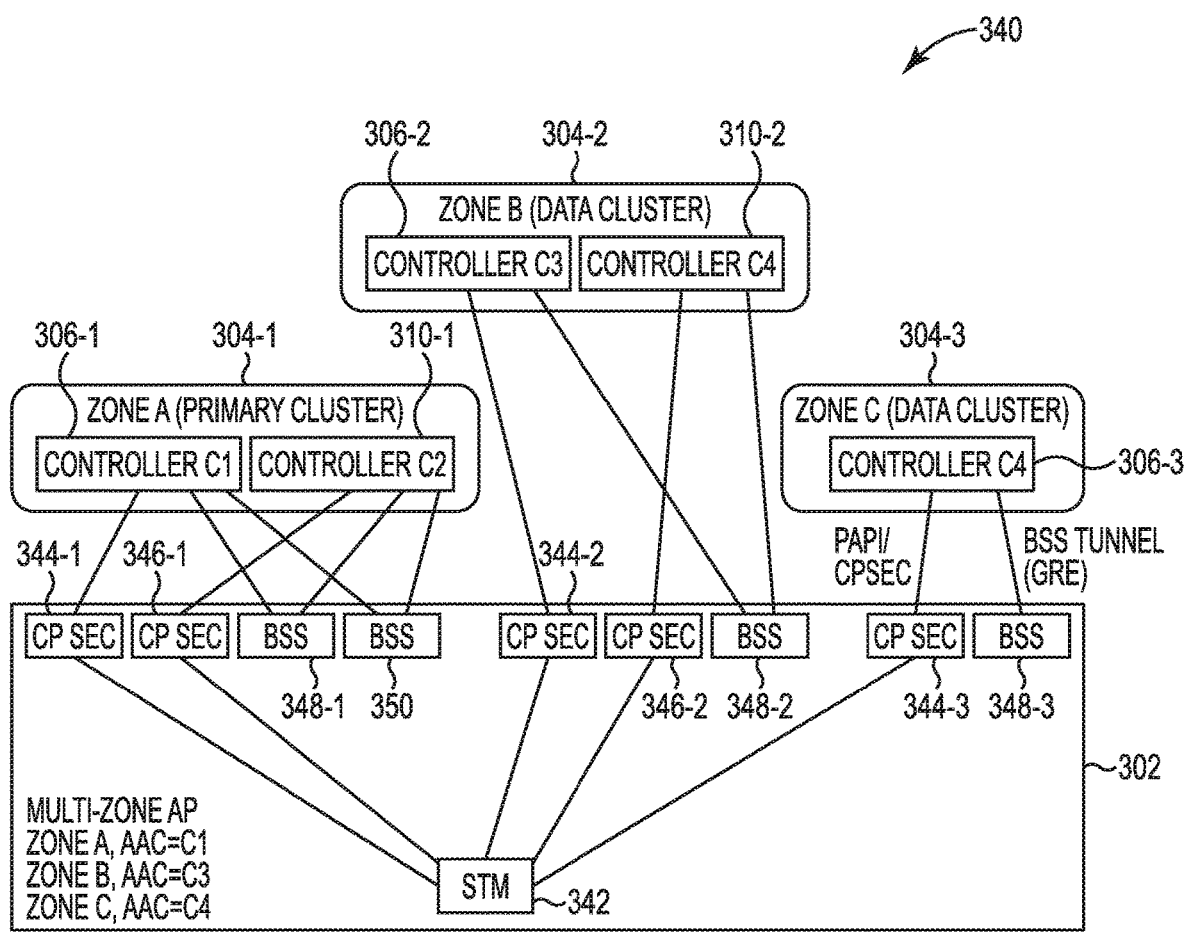
FIG. 3 illustrates an example architecture for multi-connection access point, consistent with the present disclosure.

FIG. 3 illustrates an example architecture 340 for multi-connection access point, consistent with the present disclosure. In some examples, the architecture 340 can represent a networking environment such as environment 100 as illustrated in FIG. 1. The architecture 340 can illustrate an access point 302 connected to a plurality of zones 304-1, 304-2, 304-3 with corresponding controllers (e.g., controller 306-1, 306-2, 306-3 and/or service controllers 310-1, 310-2, etc.).

The access point 302 can include a station 342. As used herein, a station 342 is a device that can utilize networking protocols (e.g., IEEE 802.11, etc.). In some examples, the access point 302 can be configured to generate a plurality of virtual access points from the station 342. As used herein, a virtual access point is an emulation of the access point 302. In some examples, the virtual access points for each of the plurality of zones 304-1, 304-2, 304-3 can include: a number of control plane security (CPSec) engines 344-1, 344-2, 344-3 for controllers 306-1, 306-2, 306-3, control plane security engines 346-1, 346-2 for service controllers 310-1, 310-2, and/or basic service set (BSS) engines 348-1, 350, 348-2, 348-3. As used herein, a BSS includes the access point 302 and associated station 342.

In some examples, the zone 304-1 can include a controller 306-1 coupled to CPSec engine 344-1, BSS engine 348-1, and/or BSS engine 350. In some examples, the zone 304-1 can include a service controller 310-1 coupled to CPSec engine 346-1, BSS 348-1, and/or BSS engine 350. In some examples, the zone 304-1 can be a primary zone as described herein.

In some examples, the zone 304-2 can include a controller 306-2 coupled to CPSec engine 344-2, and/or BSS engine 342-2. In some examples, the zone 304-2 can include a service controller 310-2 coupled to CPSec engine 346-2 and/or BSS engine 348-2. In some examples, the zone 304-2 can be a data zone as described herein. In some examples, the zone 304-3 can include a controller 306-3 coupled to CPSec engine 344-3 and/or BSS engine 348-3. In some examples, the zone 304-3 may not include a service controller. In some examples, the zone 304-3 can be a data zone as described herein.

Figure 4:
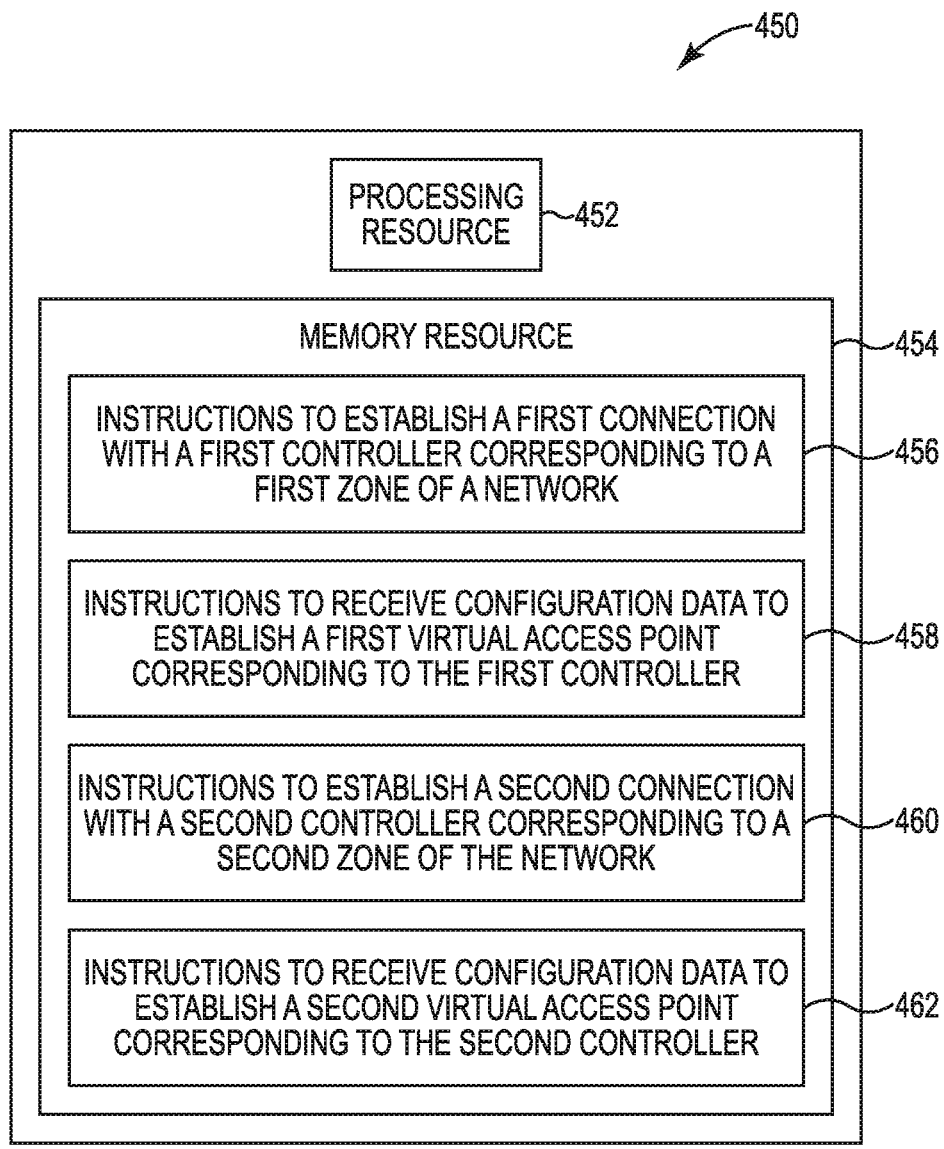
FIG. 4 is a block diagram of an example system for multi-connection access point, consistent with the present disclosure.

FIG. 4 is a block diagram of an example system 450 for multi-connection access point, consistent with the present disclosure. The system 450 may include a computing device that is capable of communicating with a remote system. In the example of FIG. 4, the system 450 includes a processing resource 452 and a memory resource 454. The memory resource 454 may store readable instructions to cause the processing resource 452 to perform a number of operations. Although the following descriptions refer to a single processing resource and a single memory resource, the descriptions may also apply to a system with multiple processing resources and multiple memory resources. In such examples, the instructions may be distributed across multiple memory resources and the instructions may be distributed across multiple processing resources. Put another way, the instructions may be stored across multiple machine-readable storage mediums and executed across multiple processing resources, such as in a distributed computing environment.

Processing resource 452 may be a central processing unit (CPU), microprocessor, and/or other hardware device suitable for retrieval and execution of instructions stored in memory resource 454. In the particular example shown in FIG. 4, processing resource 452 may receive, determine, and send instructions 456, 458, 460, 462. As an alternative or in addition to retrieving and executing instructions, processing resource 452 may include an electronic circuit comprising a number of electronic components for performing the operations of the instructions in the memory resource 454. With respect to the executable instruction representations or boxes described and shown herein, it should be understood that part or all of the executable instructions and/or electronic circuits included within one box may be included in a different box shown in the figures or in a different box not shown.

Memory resource 454 may be any electronic, magnetic, optical, or other physical storage device that stores executable instructions. Thus, memory resource 454 may be, for example, Random Access Memory (RAM), an Electrically-Erasable Programmable Read-Only Memory (EEPROM), a storage drive, an optical disc, and the like. The executable instructions may be stored on the memory resource 454. Memory resource 454 may be a portable, external or remote storage medium, for example, that allows the system to download the instructions from the portable/external/remote storage medium. In this situation, the executable instructions may be part of an "installation package". As described herein, memory resource 454 may be encoded with executable instructions for network authentication system extensions.

The system 450 may also include instructions 456 executable by a processing resource, such as processing resource 452, to establish a first connection with a first controller corresponding to a first zone of a network. Establishing a first connection with a first controller can include connecting to a controller corresponding to a primary zone as described herein (e.g., 222 in method 220 as referenced in FIG. 2, etc.). In some examples, establishing a connection to the first controller can include sending a zone flag to the first controller as described herein. In some examples, establishing a connection to the first controller can include sending the zone flag to initiate the first controller to configure IPs for a plurality of additional zones with corresponding controllers as described herein.

The system 450 may also include instructions 458 executable by a processing resource, such as processing resource 452, to receive configuration data to establish a first virtual access point corresponding to the first controller. As described herein, the first controller can send configuration data such as IP configuration data for a plurality of additional zones and/or controllers. In some examples, the first controller can send configuration information for establishing a connection between the access point and the first controller. As used herein, 'information' is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As described herein, establishing a connection between the access point and the first controller can include establishing a virtual access point to communicate data packets between the access point and the first controller. As described herein, a virtual access point can include an emulation of the access point that can act as a separate and distinct access point.

The system 450 may also include instructions 460 executable by a processing resource, such as processing resource 452, to establish a second connection with a second controller corresponding to a second zone of the network. In some examples, establishing a second connection to the second controller can include sending a zone flag to the second controller. In some examples, the zone flag can include an EAT to identify a hierarchy of the second controller. For example, the second controller can be a controller within a data zone as described herein.

The system 450 may also include instructions 462 executable by a processing resource, such as processing resource 452, to receive configuration data to establish a second virtual access point corresponding to the second controller. As described herein, the configuration data can be received to configure the second virtual access point corresponding to the second controller. Upon configuring the second virtual access point, the instructions 462 can include further instructions to start the second virtual access point and establish a connection for communicating data packets between the second controller and the second virtual access point. In some examples, the configuration data to establish the first virtual access point includes a first ESSID and the configuration data to establish the second virtual access point includes a second ESSID.

In some examples, the system 450 can receive data packets and/or data traffic from a plurality of other network devices and/or user devices via a network. As used herein, 'network device' generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like. In some examples, the traffic includes an ESSID that can be compared to an ESSID of the first controller and/or the second controller. In these examples, received traffic including the first ESSID is transferred to the first controller and received traffic including the second ESSID is transferred to the second controller.

Figure 5:
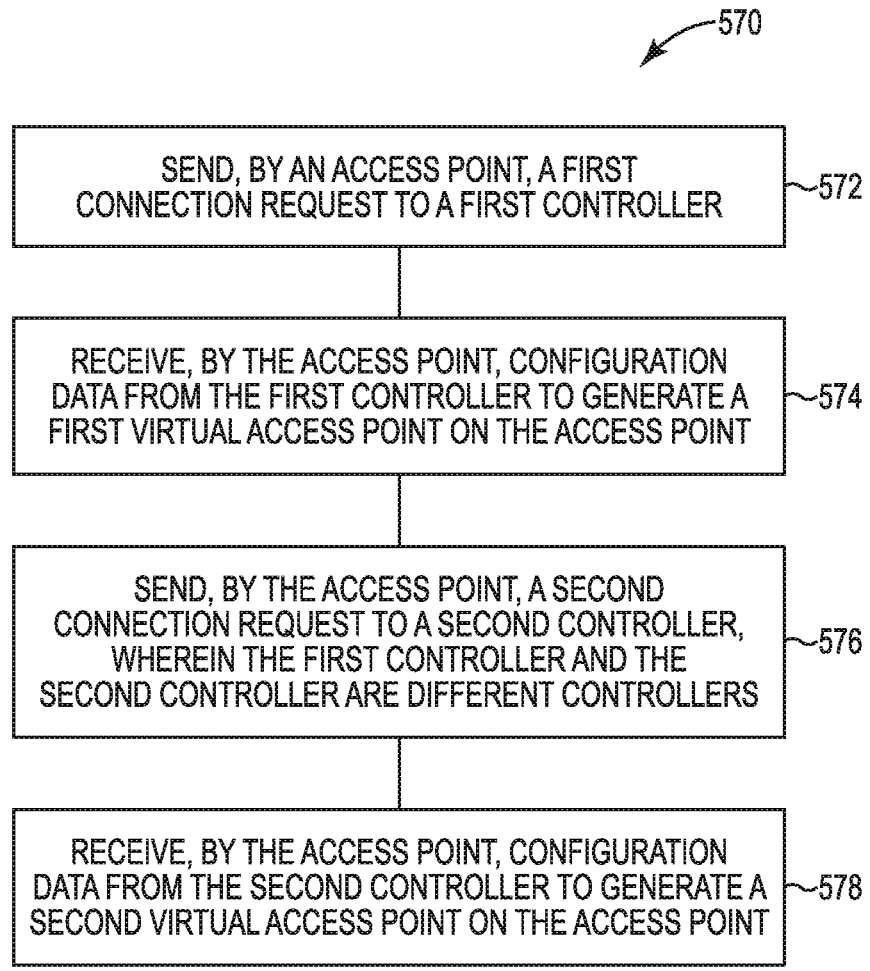
FIG. 5 is a block diagram of an example method for multi-connection access point, consistent with the present disclosure.

FIG. 5 is a block diagram of an example method 570 for multi-connection access point, consistent with the present disclosure. In some examples, the method 570 can be performed by a computing device, such as a computing device of system 450 as referenced in FIG. 4. The method 570 can be utilized to establish a multi-connection access point environment as described herein. For example, the method 570 can be utilized to generate an networking environment, such as environment 100 as referenced in FIG. 1.

At 572, the method 570 can include sending, by an access point, a first connection request to a first controller. As described herein, sending a first connection request can include sending a first zone flag to the first controller. In some examples, the first controller can be in a corresponding zone that is a primary zone as described herein. In some examples, the first connection request can include data relating to the access point. For example, the first connection request can include specification data relating to the access point. In some examples, the first controller can utilize the data of the first connection request to configure the access point. For example, the first controller can determine a quantity of virtual access points to be generated by the access point.

At 574, the method 570 can include receiving, by the access point, configuration data from the first controller to generate a first virtual access point on the access point. As described herein, the configuration data can be received by the access point from the first controller that can be utilized by the access point to configure a plurality of virtual access points. In some examples, the access point can utilize the configuration data to determine additional controllers to send additional connection requests. For example, the configuration data can be utilized to determine a second controller to send a second connection request. In some examples, the configuration data can be utilized to configure settings of the access point when establishing a connection with the first access point and/or other access points.

At 576, the method 570 can include sending, by the access point, a second connection request to a second controller, wherein the first controller and the second controller are different controllers. As described herein, sending the second connection request to a second controller can include sending a zone flag to a controller that is different than the first controller. In some examples, the second connection request can be associated with a second virtual access point. In some examples, the second connection request can include an EAT that is defined by the configuration data received by the first controller.

At 578, the method 570 can include receiving, by the access point, configuration data from the second controller to generate a second virtual access point on the access point. The configuration data from the second controller can include data to configure the communication between the second controller and the second virtual access point. As described herein, the second controller may not have administrative control over the access point. That is, the second controller is capable of managing the access point for communication between the second controller and the second virtual access point, but not capable of managing administrative settings.

In some examples, the method 570 can include receiving configuration data from the first controller includes receiving configuration instructions to send a plurality of additional connection requests to additional controllers. As described herein, the configuration data from the first controller can identify a plurality of additional controllers for the access point to send a connection request. In some examples, the configuration data from the first controller can include administrative settings for the access point.

In some examples, the method 570 can include receiving, by the access point, communication from a plurality of client devices communicatively coupled to the access point. As described herein, the access point can be a network device within a network. In some examples, the access point can receive data packets from a plurality of network devices. In these examples, the access point can determine an ESSID for the data packets and send the data packets to a corresponding controller based on the ESSID. As described herein, the first controller can utilize a first ESSID and the second controller can utilize a second ESSID that is different than the first ESSID.

In some examples, the method 570 can include transferring, by the access point, the communication to either the first controller or the second controller based on the configuration data received from the first controller. As described herein, the access point can transfer the communication and/or data packets based on the ESSID within the communication or data packet.

In some examples, the method 570 can include receiving, by the access point, setting changes from the first controller and setting changes from the second controller, wherein the setting changes from the first controller override the setting changes from the second controller. As described herein, the first controller can be within a primary zone and the second controller can be within a data zone. In some examples, the first controller within the primary zone can be relatively higher in a zone hierarchy compared to the second controller within the data zone. Thus, the first controller is capable of altering administrative settings while the second controller is not capable of altering administrative settings.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. As used herein, the designator "N", particularly with respect to reference numerals in the drawings, indicates that a number of the particular feature so designated can be included with examples of the present disclosure. The designators can represent the same or different numbers of the particular features. Further, as used herein, "a number of" an element and/or feature can refer to one or more of such elements and/or features.

What is claimed:

1. A multi-connection access point comprising a non-transitory machine-readable storage medium storing instructions that, when executed by a processing resource, cause the processing resource to:

establish a first connection to a first controller corresponding to a first zone of a network, wherein the access point receives configuration data from the first controller to generate a first virtual access point with the first controller;

establish a second connection to a second controller corresponding to a second zone of the network, wherein the access point receives configuration data from the second controller to generate a second virtual access point with the second controller, wherein the first zone and the second zone are separated by a air gap which allows the first controller to manage one or more settings of the first virtual access point without affecting the second controller from separately managing one or more settings of the second virtual access point.

2. The multi-connection access point of claim 1, wherein the first controller utilizes a first protocol and the second controller utilizes a second protocol.

3. The multi-connection access point of claim 1, wherein the access point provides services to the first zone and the second zone.

4. The multi-connection access point of claim 3, wherein the first controller manages services for the first zone and the second controller manages services for the second zone.

5. The multi-connection access point of claim 1, wherein the first controller manages settings of the access point.

6. The multi-connection access point of claim 1, wherein the first controller includes a first security classification and a second controller includes a second security classification.

7. The multi-connection access point of claim 1, wherein the instructions to establish the first connection to the first controller comprise instructions to send a zone flag to the first controller, wherein the first controller sends the configuration data to generate the first virtual access point in response to the zone flag sent to the first controller.

8. The multi-connection access point of claim 1, wherein the instructions to establish the second connection to the second controller comprise instructions to send a zone flag to a controller that is different than the first controller, wherein the second controller sends the configuration data to generate the second virtual access point in response to the zone flag sent to the controller that is different than the first controller.

9. The multi-connection access point of claim 8, wherein the zone flag comprises an extended service set identification assignment table (EAT) to identify a hierarchy of the second controller.

10. A non-transitory memory resource including instructions executable by a processing resource of a multi-connection access point to:
   establish a first connection with a first controller corresponding to a first zone of a network;
   receive configuration data to establish a first virtual access point corresponding to the first controller;
   establish a second connection with a second controller corresponding to a second zone of the network;
   receive configuration data to establish a second virtual access point corresponding to the second controller,
   wherein the first zone and the second zone are separated by a air gap which allows the first controller to manage one or more settings of the first virtual access point without affecting the second controller from separately managing one or more settings of the second virtual access point.

11. The memory resource of claim 10, wherein the configuration data to establish the first virtual access point includes a first extended service set identification (ESSID) and the configuration data to establish the second virtual access point includes a second ESSID.

12. The memory resource of claim 10, wherein received traffic including the first ESSID is transferred to the first controller and received traffic including the second ESSID is transferred to the second controller.

13. The memory resource of claim 10, wherein the instructions to establish the first connection with the first controller comprise instructions to send a zone flag to the first controller, wherein the first controller sends the configuration data to establish the first virtual access point in response to the zone flag sent to the first controller.

14. The memory resource of claim 10, wherein the instructions to establish the second connection with the second controller comprise instructions to send a zone flag to the second controller, wherein the second controller sends the configuration data to establish the second virtual access point in response to the zone flag sent to the second controller.

15. A method, comprising:
   sending, by multi-connection access point, a first connection request to a first controller corresponding to a first zone of a network;
   receiving, by the multi-connection access point, configuration data from the first controller to generate a first virtual access point on the access point;
   sending, by the multi-connection access point, a second connection request to a second controller corresponding to a second zone of the network, wherein the first controller and the second controller are different controllers;
   receiving, by the multi-connection access point, configuration data from the second controller to generate a second virtual access point on the access point,
   wherein the first zone and the second zone are separated by a air gap which allows the first controller to manage one or more settings of the first virtual access point without affecting the second controller from separately managing one or more settings of the second virtual access point.

16. The method of claim 15, wherein receiving configuration data from the first controller includes receiving configuration instructions to send a plurality of additional connection requests to additional controllers.

17. The method of claim 15, comprising receiving, by the multi-connection access point, communication from a plurality of client devices communicatively coupled to the access point.

18. The method of claim 17, comprising, transferring, by the multi-connection access point, the communication to either the first controller or the second controller based on the configuration data received from the first controller.

19. The method of claim 15, comprising receiving, by the multi-connection access point, setting changes from the first controller and setting changes from the second controller, wherein the setting changes from the first controller override the setting changes from the second controller.

20. The method of claim 15, wherein sending the first connection to the first controller comprises sending a zone flag to the first controller, wherein the first controller sends the configuration data received by the access point to generate the first virtual access point in response to sending the zone flag to the first controller.

* * * * *